United States Patent
Turman

[19]

[11] Patent Number: 5,836,647
[45] Date of Patent: Nov. 17, 1998

[54] VEHICLE SEAT WITH SHOCK ABSORPTION

[76] Inventor: Ben Turman, 4318 Date Ave., La Mesa, Calif. 91941

[21] Appl. No.: 859,190

[22] Filed: May 20, 1997

[51] Int. Cl.[6] ............................. B60N 2/42; B60R 21/00
[52] U.S. Cl. ........................ 297/216.1; 297/216.44; 297/216.18; 297/284.3; 297/284.6; 297/284.4; 297/353; 248/548; 248/900
[58] Field of Search ........................ 297/216.1, 216.15, 297/216.16, 216.18, 216.19, 284.3, 284.4, 284.6, 284.7, 353, 216.14; 248/548, 900

[56] References Cited

U.S. PATENT DOCUMENTS

| | | | |
|---|---|---|---|
| 2,558,171 | 6/1951 | Cheseley | 297/284.4 X |
| 2,639,913 | 5/1953 | Reynolds | 297/216.1 X |
| 2,993,732 | 7/1961 | Walker | 297/216.18 |
| 3,268,256 | 8/1966 | Blank | 297/216.18 |
| 3,269,774 | 8/1966 | Hildebrandt et al. | 297/216.18 |
| 3,475,054 | 10/1969 | Flint | 297/353 |
| 3,552,795 | 1/1971 | Perkins et al. | 297/216.18 |
| 3,897,101 | 7/1975 | Hess | 297/216.1 X |
| 3,968,863 | 7/1976 | Reilly | 297/216.1 X |
| 4,090,580 | 5/1978 | McLennan | 297/216.1 X |
| 4,204,659 | 5/1980 | Phillips et al. | 248/548 X |
| 4,248,480 | 2/1981 | Koucky et al. | 297/216.1 X |
| 4,634,179 | 1/1987 | Hashimoto et al. | 297/284.6 |
| 4,641,884 | 2/1987 | Miyashita et al. | 297/284.3 X |
| 4,676,550 | 6/1987 | Neve de Mevergnies | 297/353 |
| 4,690,456 | 9/1987 | Chiba et al. | 297/284.6 |
| 4,720,139 | 1/1988 | McSmith | 248/548 X |
| 4,787,676 | 11/1988 | Neve de Mevergnies | 297/353 |
| 4,824,175 | 4/1989 | Tokugawa | 248/548 X |
| 5,076,529 | 12/1991 | Dove et al. | 248/900 X |
| 5,106,144 | 4/1992 | Hayakawa et al. | 297/216.1 X |
| 5,290,089 | 3/1994 | Oleszko et al. | 297/216.1 X |
| 5,320,308 | 6/1994 | Bilezikjian et al. | 297/216.1 X |
| 5,454,622 | 10/1995 | Demopoulos | 297/216.1 X |
| 5,676,336 | 10/1997 | Nefy et al. | 248/900 X |
| 5,676,421 | 10/1997 | Brodsky | 297/216.14 X |
| 5,678,891 | 10/1997 | O'Neill | 297/284.3 X |
| 5,722,722 | 3/1998 | Massara | 297/216.14 X |

FOREIGN PATENT DOCUMENTS 2070920  9/1981  United Kingdom ................. 297/353

*Primary Examiner*—Milton Nelson, Jr.
*Assistant Examiner*—Rodney B. White
*Attorney, Agent, or Firm*—Edward E. Roberts

[57] ABSTRACT

A vehicle seat construction with a rear impact energy absorbing damping system along with a fully adjustable, fitted, contoured seat back. First and second damping systems are provided, the first being between the seat base and the floor of the vehicle with the second being between the seat base and seat back. The damping systems include shock absorbing devices in the track construction and in the seat base construction in the region of connection to the seat back. The seat back is provided with a vertical telescoping and pivoting support frame arrangement for height and contour adjustment for the occupant, and air bags for adjusting the contour of the seat back to the back of the occupant. The seat back construction includes configurable and positionable components for the lower back, the middle back and the head/neck area of the occupant, each component including inflatable pockets for contouring of the front surface of the seat back.

20 Claims, 4 Drawing Sheets

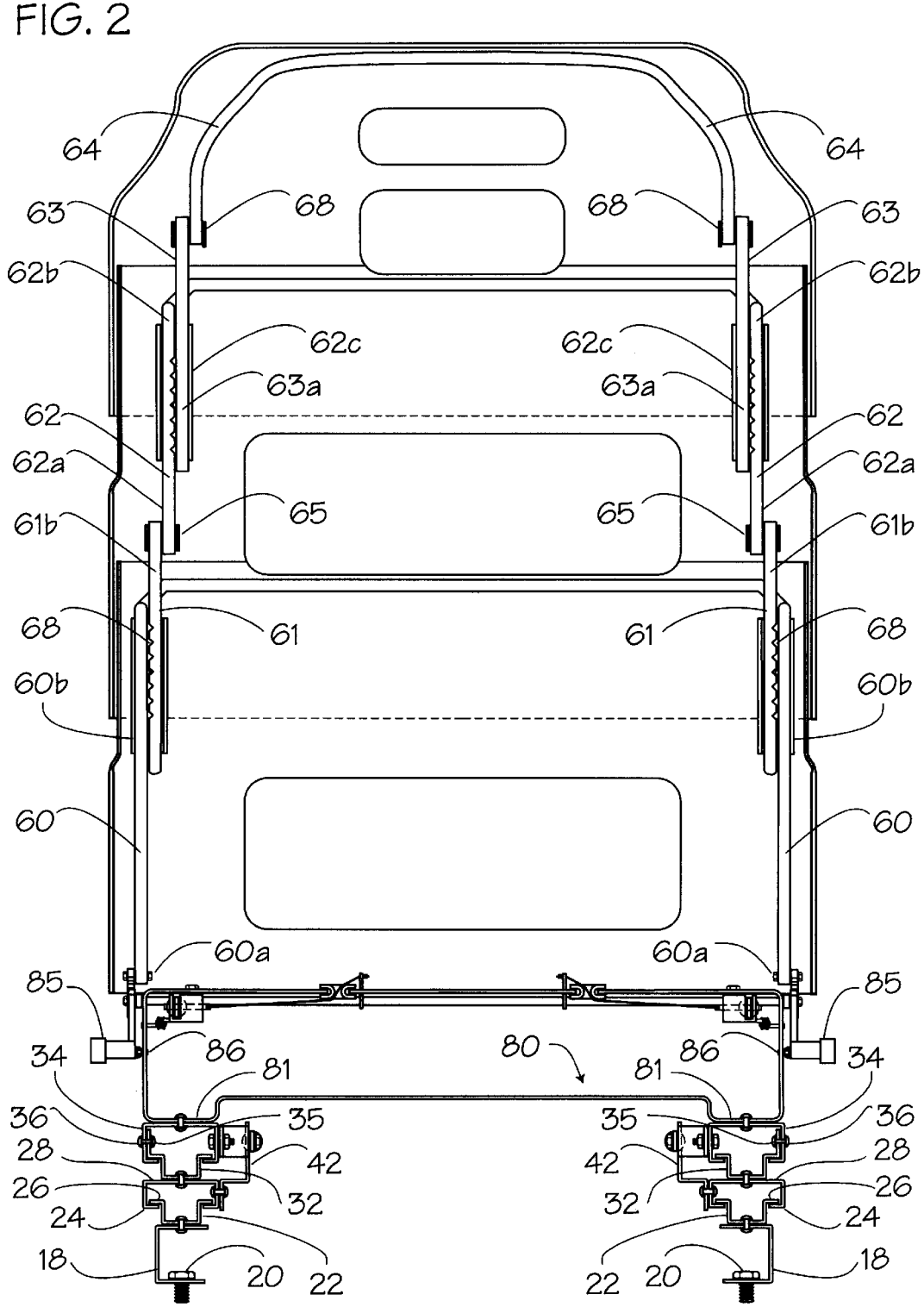

VEHICLE SEAT WITH SHOCK ABSORPTION

BACKGROUND OF THE INVENTION

1. Field of the Invention

This invention relates to vehicle seats, and more particularly to an automobile or truck seat having occupant contouring means and shock absorption capabilities for protection against rear impact collisions.

2. Description of the Prior Art

Automobiles of recent design have incorporated air bags as well as seat belts for protection of the occupant. However, vehicle seats, and particularly automobile seats, have been largely ignored as a means of protecting the occupant. Most automobile seats have provision for providing comfort for the driver, a d sometimes for the front passenger as well. Seat belts and air bags are deigned and intended mainly to protect the occupant in the event of a front end collision, that is, to control or retard the forward movement of the occupant, principally the driver and front seat passenger.

One vehicle seat, designed for aircraft passengers, is shown and described in U.S. Pat. No. 3,112,995, entitled "Vehicle Seat Construction for Cushioning the Force of Impact", which issued to Stolz on Dec. 3, 1963 and wherein there is provided a seat suspended by journals at the upper seat back with the lower portion secured below the seat portion with two pairs of shear pins which, upon impact, shear, thus enabling the seat to pivot about the journals for absorbing a portion of the impact.

Another seat construction is shown and described in U.S. Pat. No. 3,853,298, entitled "Energy Absorbing Seat Adjuster" which issued to Libkie et al on Dec. 10, 1974. The seat construction includes adjusting tracks, on which the seat adjustably moves, the upper and lower tracks being provided with coacting frictional means in the form of a friction shoe engaging a friction lining. The two parts may be manually separated for providing seat adjustment, but during use, the two parts are in frictional contact, whereby upon impact, the frictional movement between the two parts provides energy absorption.

In accordance with a feature of the present invention, there is provided a new and improved vehicle seat construction having shock absorption capabilities, as well as occupant back contouring capability for protecting the occupant in the event of a rear impact collision.

SUMMARY OF THE INVENTION

The foregoing and other objects of the invention are accomplished by providing a vehicle seat construction with an energy absorbing damping system along with a fully adjustable, fitted, contoured seat back. First and second damping systems are provided, the first being between the seat base and the floor of the vehicle with the second being between the seat base and seat back. The damping systems include shock absorbing devices in the track construction and in the seat base construction in the region of connection to the seat back. The seat back is provided with a vertical telescoping and pivoting support frame arrangement for height and contour adjustment for the occupant, and air bags for adjusting the contour of the seat back to the back of the occupant. The seat back construction includes configurable and positionable components for the lower back, the middle back and the head/neck area of the occupant, each component including inflatable pockets for contouring of the front surface of the seat back.

Other objects, features and advantages of the invention will become apparent on a reading of the specification when taken in conjunction with the drawings in which like reference numerals refer to like elements in the several views.

BRIEF DESCRIPTION OF THE DRAWINGS

FIG. 1b is a side elevational cross-sectional view of the seat back of the vehicle seat of FIG. 1a;

FIG. 1c is a side elevational cross-sectional view of the seat base and track arrangement of the vehicle seat of FIG. 1a; and FIG. 2 is a front cross-sectional view of the vehicle seat of FIG. 1a.

DESCRIPTION OF THE PREFERRED EMBODIMENT

Figure 1A:
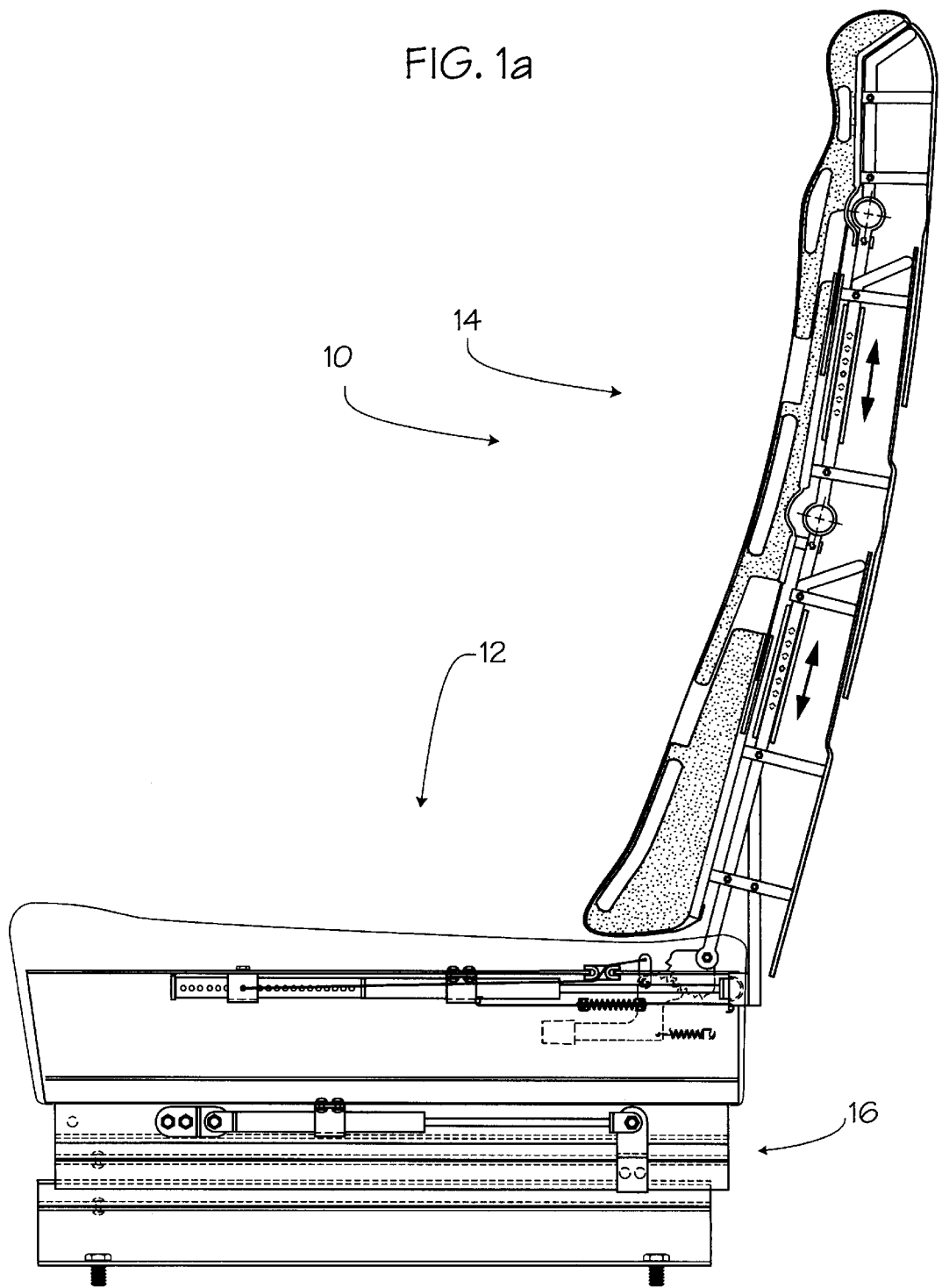
FIG. 1a is a side elevational cross-sectional view of a vehicle seat in accordance with a preferred embodiment of the invention.

Referring now to the drawings and initially to FIG. 1a, there is shown a vehicle seat, generally designated 10, having a seat base, generally designated 12 and a seat back, generally designated 14. For assembly of the seat 10 into a vehicle, a track arrangement, generally designated 16, is employed.

Figure 1B:
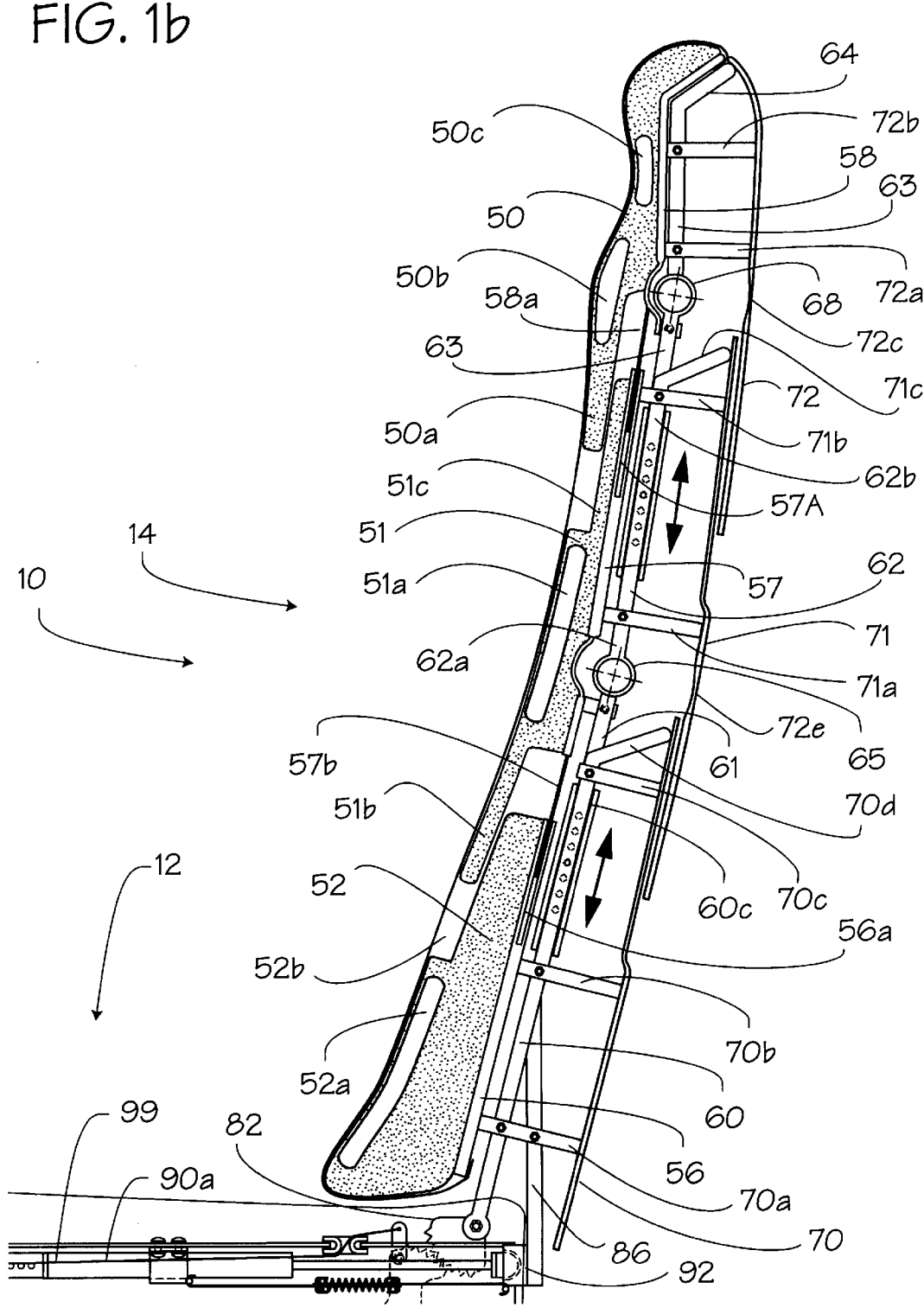
Figure 1C:
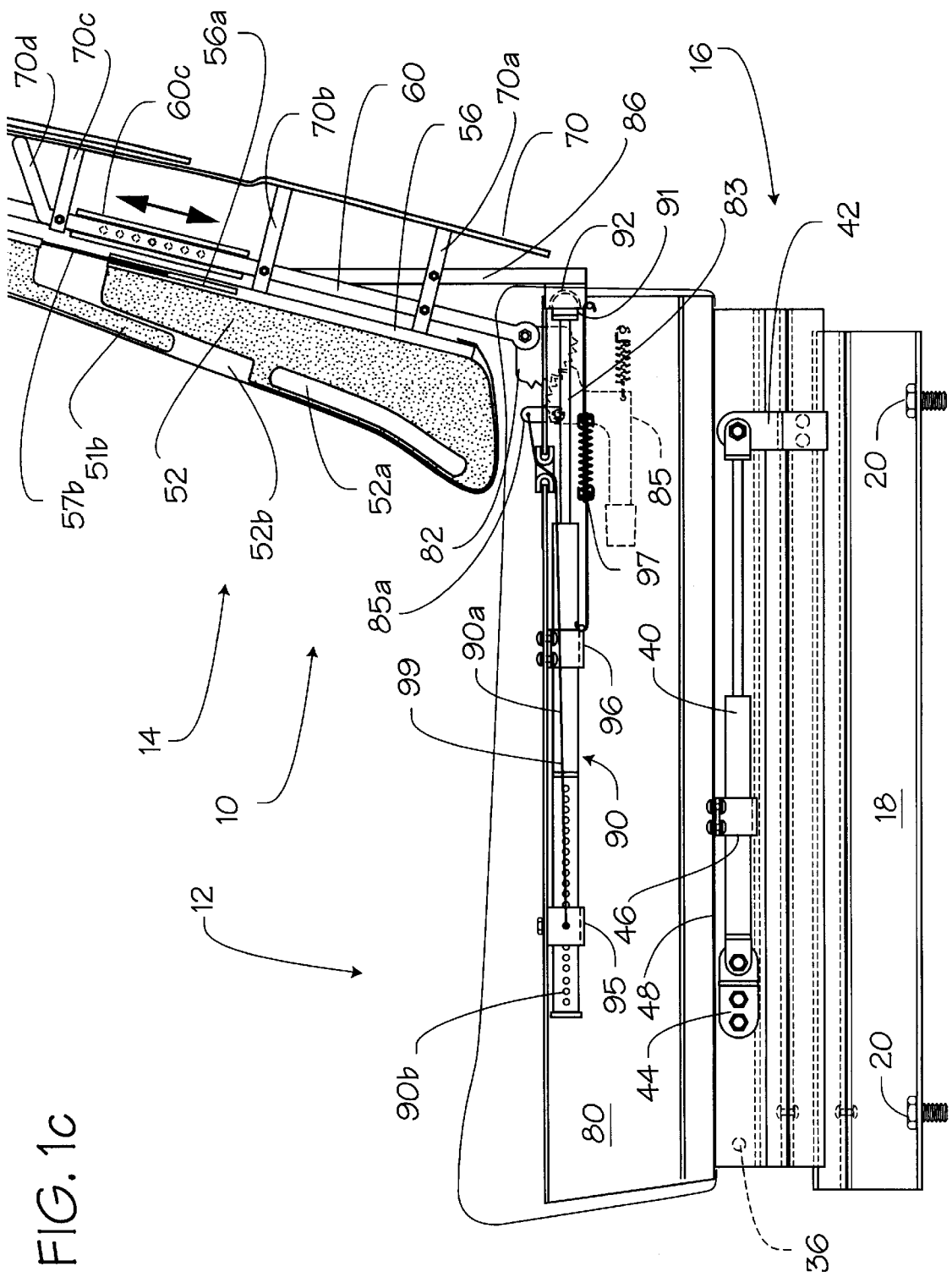

Referring particularly to FIGS. 1c and 2, the track arrangement 16 includes first and second track pairs configured in coacting relationship such that the seat structure 10 is adjustably movable relative to the vehicle floor and the second track pair, with energy absorbing means in interoperative relation between the two track pairs, enabling limited damped movement of the seat structure 10 relative to the first track pair in the event of a rear impact on the vehicle. In particular, the first track pair includes a C-shaped floor rail support member 18 adapted for securing to the vehicle floor by means of suitable fasteners such as bolts 20.

Mounted atop, and fastened to, the support member 18 is a first track portion 22 of a first track pair, the portion 22 having laterally extending opposed guide slots 24 for receiving the inwardly extending lip portions 26 of the upper, or second track portion 28, which is formed as a C-shaped member, positioned as by rotation through an angle of ninety degrees with the spine portion thereof lying in a horizontal plane above the first track portion 22.

A second track pair coacts with the first track pair, the second track pair overlying the first track pair between the seat base and the floor of the vehicle. To this end, the second track pair includes a first generally U-shaped track portion 32 configured similarly to track portion 22, secured to the upper surface of second track portion 28 of the first track pair, such as by rivets. A second track portion 34, configured and positioned the same as track portion 28, overlies the first track portion 32 for conditional slidable relation relative thereto. The two track portions 32 and 34 are secured together by a shear pin 36. The lower track portion 34 is provided with an upwardly integrally formed flange 35 which abuts against the inner surface of the upper track portion 34 and through which an aperture is formed for insertion of the shear pin 36.

In the absence of impact, the two track portions remain in a fixed position; however, upon shearing of pin 36 under force of an impact, the track portions are slidable relative to one another, in a limited, controlled and damped manner as will be described.

As best shown on FIG. 1c, there is mounted a first energy absorbing means, such as a spring loaded, dual position variable damping shock absorber 40, which lies in a plane generally parallel to the path of the movement of the first and second track pairs. One end of the shock absorber 40 is mounted securely to the upper track portion 28 of the lower track pair, with the other end fastened to the upper track portion 34 of the upper track pair.

An offset bracket 42 has the lower flange thereof secured, such as by a rivet, to the side of the upper track portion 28 of the lower track pair while the upper end is offset and configured for fastening to the side of the upper track portion 34 of the upper track pair by use of a pair of bolts, rivets or the like.

As shown, the rod end of shock absorber 40 is fastened, such as by a bolt through the rod clevis, to the bracket 42. The piston end of the shock absorber 40 is attached to a second bracket 44, the bracket 44 being secured to the upper track portion 34 of the upper track pair, with the bracket 44 having an offset segment for attachment of the piston end of the shock absorber 40. For additional support, a clamp 46 encircles the body of the piston portion of the shock absorber 40 and is secured to the bottom plate 48 of the seat base 12.

In operation, the seat base 12 supporting structure shown in the drawings, is configured for adapting the seat 10 to a current model automobile. For original installation on a new vehicle, the structure of the tracks may vary, while retaining the basic principle of the invention.

As previously stated, the upper track pair normally moves with the upper track portion 28 of the lower track pair during horizontal adjustment of the seat 10. However, upon impact from the rear of the vehicle, the natural forces acting on the occupant drives the occupant rearwardly. With a sufficient force of impact, the shear pin 36 shears, thus enabling movement of the upper track portions relative to the fixed lower track pair. The shock absorber 40 then compresses controllably under this force to absorb a portion of the energy of the impact.

However, in accordance with the invention, other protection means are provided. The occupant is best protected when the seat is contoured to match the buttocks and back side of the occupant. To accomplish this, the seat back 14 is specially constructed for adjustment vertically, as well as horizontally, to provide a cushioning surface in intimate contact with the back of the occupant. To this end, the seat back is divided into anatomically supporting components, which are adjustable relative to one another in the vertical direction (as well as including inflatable air pockets), to provide intimate contact with the lower back, lumbar region, and head and neck region of the anatomy.

As best depicted in FIG. 1b, the seat back 14 is provided with a plurality of shaped overlapping foam members 50–52 (from top to bottom), the shape being intended for enabling slidable vertical overlying positioning of one relative to the other. Each of the foam members 50–52 is provided with at least one inflatable air pocket which can be inflated by manual or electrical means (not shown). Starting with the lowermost (or lower back) member 52, the foam member is configured with a generally vertically extending elongate transversely-disposed inflatable pocket 52a, with the driver side surface having a recess 52b formed at the upper portion which is somewhat wedge-shaped.

The center foam member 51 (the lumbar member) has an elongate vertically extending transversely-disposed inflatable pocket 51a. The lower end 51b of the member 51 has a narrow cross-sectional configuration and is dimensioned and positioned for overlying relation with the recess 52b. A ledge or recess 51c is also formed in the upper end of the foam member 51, for coaction with an overlying edge portion 50a of the headpiece foam member 50. The headpiece foam member 50 is provided with first and second inflatable transversely-disposed pockets 50b and 50c for adjustment to the appropriate level for the occupant.

The foam members 50–52 are each mounted, at the rear surface, to a suitable plate formed of metal or plastic which has a degree of rigidity for the intended purpose. As shown, starting with the bottom plate member 56, the lower back foam member is adhesively bonded to the plate member 56. The member 56 is provided, at its upper lateral edge, with a guide slot 56a. The lumbar plate member 57 is provided with a like slot 57a at its upper lateral edge, while, at the lower lateral edge, it is provided with a downwardly extending flange portion 57b which is configured and dimensioned for being received within the slot 56a of the lower plate member 56. Likewise, the headpiece plate member 58 is provided at its lower lateral edge with a like formed flange portion 58a for being received within the guide slot 57a of the lumbar plate member 57.

For primary support relative to the seat base 12, the seat back 14 construction includes a metal framework which is likewise adjustable in the vertical direction, it being understood that each seat back section operates as a unit. In other words, the seat back 14 has a headpiece unit, a lumbar unit and a lower back unit, each including a foam member, a foam member support plate, a corresponding frame section, and an outer cosmetic shell member which will be described hereinafter. The framework includes side bar members which are slidable relative to one another (through a defined length) and pivotable relative to one another (through a defined angle).

By reference also to FIG. 2, lower side bar 60 is coupled for pivoting at the lower end 60a thereof relative to the seat base 12. The upper end of bar 60 is provided with a channel portion 60b, configured and dimensioned for adjustably receiving therein the lower end 61a of the next bar 61. As illustrated, the lower end is provided with a ratchet-like surface which coacts with a spring loaded ball 68 positioned within a recess in the channel portion 60b. In this manner, under some force, the two bars may be telescopically adjusted relative to one another in the vertical direction.

The upper end 61b of side bar 61 is pivotally coupled to the lower end 62a of side bar 62 by means of pivot point spring and ball arrangement 65 which enables pivoting of the parts by use of some force, while enabling the selected position to remain fixed during use. As previously mentioned, the pivoting of these parts will be through a limited angle consistent with the natural anatomy of the body.

The pivot point spring and ball arrangement 65 is conventional and includes a radially serrated inner surface for coaction with one or more ball and spring members within recesses in the coacting opposite surface. The upper end 62b of bar 62 is provided with a channel portion 62c generally the same as the channel portion 60c for detentingly receiving the lower end 63a of side bar 63; while the upper end of side bar 63 is pivotally coupled to a cross-over frame bar 64, the pivotal coupling 68 being spring loaded and detentable the same as coupling 65.

The back shell of the seat back units are covered with suitable generally rigid plastic sheet material formed to the desired rear seat appearance. The lower shell 70 is secured to the frame portion bar 60 by means of laterally positioned support bars 70a, 70b and 70c, and a diagonal upper bar 70d which extends from the bar 60 to the shell 70 for support of the shell 70 in a position in general alignment with the center axis of the seat back 14. The shell 70, in cross-sectional configuration, has an upper part which is offset inwardly of the plane of the lower part, that is toward the seat back axis, the offset distance corresponding to about twice the thickness of the shell material.

The center shell 71 is supported by the bar 62 by means of laterally positioned support bars 71a and 71b, and a diagonal upper bar 71c which extends from the bar 62 to the shell 71 for support of the shell 71 in a position in general alignment with the center axis of the seat back 14. The shell 71, in cross-sectional configuration, has an upper part which is offset inwardly of the plane of the lower part, that is toward the seat back axis, the offset distance corresponding to about twice the thickness of the shell material. The lower part is dimensioned and arranged for overlying relation with the upper part of the lower shell 70.

The uppermost shell 72 is contoured at the upper edge to blend into the upper seat configuration, while the lower part overlies the upper part of the middle shell 71. Support for the shell 72 is provided by lateral braces 72a and 72b attached to bar 63. For flexibility, the shell material of shells 70 and 72 is thinner at locations 70e and 72c.

By the described configuration of the seat back 14, the individual back-supporting components are adjustable, one relative to the other, both vertically as well as angularly, to provide contouring of the axis of each component to the back of the individual, while the inflatable pockets assist in contouring the seat back surface to the contour of the anatomy of the back of the individual to provide intimate contact between the user and the adjacent seat back surface.

The seat base 12 is constructed with a support framework for attachment to the seat base supporting structure previously described. By reference to FIG. 2, there is a supporting frame metallic structure 80 of box-like configuration with depending portions 81 secured to the upper surface of upper track portion 34 of the upper track pair. As also shown in FIG. 1c, the seat back 14 is adjustable relative to the seat base 12 by means of a ratchet arrangement consisting of intermeshing arcuate cams 82 and 83.

Cam 82 is pivotally coupled to the lower end of seat back frame bar 60, the pivoting of cam 82 being accomplished by manual. pivoting of meshed cam 83 by means of handle 85 which, as shown in FIG. 2, is provided with detentable means 86 coacting with the side of structure 80. For additional protection for the occupant, the cams 82 and 83 may be formed of a metal which enables the toothed edges thereof to shear under significant impact.

The seat base includes a second energy absorbing means including a supplemental shock absorber arrangement which includes a spring loaded, dual position variable damping shock absorber 90, which lies in a plane generally parallel to the path of the movement of the first and second track pairs, as well as the path of movement of the first shock absorber 40. The shock absorber 90 is secured at the piston end 90a by means of a bracket guide 96 secured to the frame 80 and loosely encircling the piston body of shock absorber 90. The piston body is provided with a forwardly extending detent bar 90b, which passes through a coacting slide bracket 95 secured to the seat base frame 80. The inner surface of bracket 95 is suitably provided with a spring-loaded ball for coaction with the depressions or detents in the facing surface of the detent bar 90b. A cable 99 is strung front the spring portion of the ball of the bracket 95 to a lever end 85a of the seat positioning lever 85 to enable movement of the piston body 90a relative to the seat base 12 when the user positions the seat back 14 relative to seat base 12.

While the first shock absorber absorbs energy between the seat base 12 and the floor of the vehicle, the second shock absorber 90 absorbs energy between the seat base 12 and the seat back 14, as will be described. For this purpose, the seat back 14 connection to the seat base 12 is provided with a lever arm 86 which depends from the seat back 14, the upper end thereof being secured to the seat back bar 60 at the junction with lateral bar member 60b.

An intermediate part of lever arm 86 is secured to both bar 60 and lateral bar 70a, thus forming a triangle, with the lower distal end of lever arm 86 having a component 92 at the end thereof which has a cup-shaped recess for receiving a hemispherical end 91 of the rod end of the piston 90. When the seat back 14 is tilted forward, the lower end of lever arm 86 separates from the rod end 91 of the piston and reorients itself when the seat back 14 is returned to its upright position. To assist in this, a seat back return spring 97 is connected between the bracket 96 and the lower part of lever arm 86.

While the description has addressed one shock absorber 40 and one shock absorber 90, it is to be understood that, as shown in FIG. 2 there is preferably a like shock absorber on the opposite side of the seat in a like position and coacting in substantially the same way. In other words, the shock absorbers are preferably arranged in pairs for each seat 10.

In use, the occupant first adjusts each of the configurable and positionable components of the seat back 14. That is, vertical height is adjusted by moving the component vertically in the up or down direction to the desired height and position. The components are then pivoted through the desired limited angle by means of the pivot point spring and ball arrangements 65 and 68. One or more of the inflatable pockets are inflated (or deflated) as desired by the user, until the back of the occupant is in intimate contact from the buttocks to the head with the adjoining surface of the seat back 14.

In operation, in the event of a rear impact, there is a controlled, staged absorption of energy effected to protect the occupant. Initially, the seat 10 commences rearward movement which, if there is sufficient impact, results in shearing of one or both of the shear pins 36 and the teeth of one or both cams 82, 83. The shock absorber 40 absorbs energy resulting from movement between the lower track pair and the upper track pair. The shock absorber 90 absorbs energy between rearward movement of the seat back relative to the seat base 12. Since it is unlikely that the shear pin and teeth will shear at the same time, there is a staged absorption of the energy of the impact. It is also to be emphasized that certain parts of the vehicle seat construction may be used without the other parts for providing a measure of protection, although it is preferred that the construction, as shown, be employed.

In accordance with the present invention there have been shown and described a preferred embodiment of a vehicle seat construction with shock absorption or energy release arrangements. It is to be understood that other modifications may be made within the spirit and scope of the invention.

What is claimed is:

1. A vehicle seat comprising:

a seat base;

a seat back;

track means coacting with said seat base for movably supporting the seat within the vehicle;

first energy absorbing means in coacting relation between said seat base and said track means;

means on said base for supporting said seat back;

energy absorbing means coacting between said supporting means and said seat base, and wherein shear means affixes said seat base to said track means whereby, on impact with the rear of the vehicle, said shear means shears thereby enabling relative movement between said seat base and said track means under damped control of said first energy absorbing means.

2. The seat according to claim 1 wherein the seat back includes first, second and third component parts for the lower back, middle back and head/neck areas of an occupant, with said component parts being adjustable relative to one another.

3. The seat according to claim 2 wherein said component parts are interconnected for angular positioning, each relative to an adjacent interconnected component part.

4. The seat according to claim 3 wherein said component parts are interconnected for displacement from one another in the direction of the longitudinal centerline of the seat back, each relative to an adjacent interconnected component part.

5. The seat according to claim 1 wherein said supporting means includes shear means whereupon shearing thereof under force of an impact with the rear of the vehicle there is rearward movement of said seat back relative to said seat base under damped control of said energy absorbing means coacting between said supporting means and said seat base.

6. The seat according to claim 5 wherein said seat back is adjustable to conform and contour said seat back surface to the back of an occupant, and said seat back includes first, second and third component parts for the lower back, middle back and head/neck areas of the occupant, with said component parts being adjustable relative to one another.

7. A vehicle seat comprising:

a seat base;

track means coacting with said seat base for adjustably supporting the seat within the vehicle;

means for mounting at least one first shock absorber between said seat base and said track means;

a seat back;

means on said seat base for pivotally supporting said seat back;

at least one second shock absorber connected in coacting relation between said seat back and said seat base; and shear means affixing said seat base to said track means for providing upon shearing shock absorbed movement between said seat base and said track means.

8. A vehicle seat comprising:

a seat base;

track means coacting with said seat base for adjustably supporting the seat within the vehicle;

means for mounting at least one first shock absorber between said seat base and said track means;

a seat back;

means on said seat base for pivotally supporting said seat back;

at least one second shock absorber connected in coacting relation between said seat back and said seat base; and wherein said mounting means includes at least one shear pin affixing said seat base to said track means whereby, on impact with the rear of the vehicle, the shear pin shears thereby enabling relative movement between said seat base and said track means under damped control of said at least one first shock absorber.

9. A vehicle seat comprising:

a seat base;

track means coacting with said seat base for adjustably supporting the seat within the vehicle;

means for mounting at least one first shock absorber between said seat base and said track means;

a seat back;

means on said seat base for pivotally supporting said seat back;

at least one second shock absorber connected in coacting relation between said seat back and said seat base; and wherein said supporting means includes a shearable member for permitting rearward movement of said seat back relative to said seat base on shearing thereof under force of an impact with the rear of the vehicle thereby enabling rearward movement of said seat back relative to said seat base under damped control of said at least one second shock absorber.

10. The seat according to claim 7 wherein said seat back includes first, second and third component parts for the lower back, middle back and head/neck areas of an occupant, with said component parts being adjustable relative to one another for enabling contouring and dimensioning of the seat back to conform to the anatomy of the occupant.

11. The seat according to claim 10 wherein said component parts are interconnected for angular positioning, each relative to an adjacent interconnected component part.

12. The seat according to claim 11 wherein said component parts are interconnected for displacement from one another in the direction of the longitudinal centerline of the seat back, each relative to an adjacent interconnected component part.

13. A vehicle seat comprising:

a seat base;

track means coacting with said seat base for movably supporting the seat within the vehicle;

means for mounting at least one first shock absorber between said seat base and said track means, said mounting means; including at least one first shear member for normally fixing the position of said seat base relative to said track means;

a seat back;

means on said seat base for pivotally supporting said seat back; and means for attachment of at least one second shock absorber in coacting relation between said seat back and said seat base, said attachment means including at least one second shear member for normally preventing rearward movement of said seat back relative to said seat base, whereby, under force of a rear impact on the vehicle, said at least one first and second shear members shear enabling rearward movement of said seat back relative to said seat base under damped control of said at least one second shock absorber and enabling rearward movement of said seat base relative to said track means under damped control of said at least one first shock absorber.

14. The seat according to claim 13 wherein the seat back includes first, second and third component parts for the lower back, middle back and head/neck areas of an occupant, with said component parts being adjustable relative to one another.

15. The seat according to claim 14 wherein said component parts are interconnected for angular positioning, each relative to an adjacent interconnected component part.

16. The seat according to claim 15 wherein said component parts are interconnected for displacement from one another in the direction of the longitudinal centerline of the seat back, each relative to an adjacent interconnected component part.

17. The seat according to claim 13 wherein said seat back is adjustable to conform and contour the seat back surface to the back of an occupant.

18. A vehicle seat having a seat base mounted on a track for movably supporting the seat to the floor of said vehicle, and a seat back, the seat including an energy absorbing damping system and a seat back frame arrangement for height and contour adjustment for an occupant, said seat comprising:

first damping means in coacting relationship between said seat base and said track for absorbing impact energy between said seat base and the floor of said vehicle upon impact of the vehicle;

second damping means in coacting relationship between said seat base and said seat back for absorbing impact energy between said seat base and said seat back upon impact of the vehicle;

telescoping seat means for adjustment for the height of the occupant;

seat back construction including individually configurable and positionable components for the lower back, the middle back, and the head/neck area, each relative to the other, for adjusting the contour of the back of said seat to the back of the occupant.

19. The seat according to claim 18 further including shear means affixed between said seat base and said track whereby, on impact with the rear of the vehicle, said shear means shears thereby enabling relative movement between said seat base and said track under damped control of said first damping means.

20. The seat according to claim 18 further including shear means affixed between said seat base and said seat back whereupon shearing thereof under force of an impact with the rear of the vehicle there is rearward movement of said seat back relative to said seat base under damped control of said second damping means.

* * * * *